US006689466B2

(12) United States Patent
Hartmann

(10) Patent No.: US 6,689,466 B2
(45) Date of Patent: Feb. 10, 2004

(54) STABLE PHASE CHANGE MATERIALS FOR USE IN TEMPERATURE REGULATING SYNTHETIC FIBERS, FABRICS AND TEXTILES

(75) Inventor: Mark H. Hartmann, Superior, CO (US)

(73) Assignee: Outlast Technologies, Inc., Boulder, CO (US)

(*) Notice: Subject to any disclaimer, the term of this patent is extended or adjusted under 35 U.S.C. 154(b) by 0 days.

(21) Appl. No.: 09/960,901

(22) Filed: Sep. 21, 2001

(65) Prior Publication Data

US 2002/0054964 A1 May 9, 2002

Related U.S. Application Data

(60) Provisional application No. 60/234,149, filed on Sep. 21, 2000.

(51) Int. Cl.⁷ .................. B32B 15/02; B32B 17/02; B32B 19/00; B32B 21/02; B05D 7/02
(52) U.S. Cl. ................. 428/402.2; 428/42.21; 428/402.24; 428/403; 428/407; 427/230
(58) Field of Search .............. 428/402.2, 402.21, 428/402.24, 403, 407; 427/230

(56) References Cited

U.S. PATENT DOCUMENTS

| | | |
|---|---|---|
| 4,003,426 A | 1/1977 | Best et al. |
| 4,111,189 A | 9/1978 | Dizon |
| 4,122,203 A | 10/1978 | Stahl |
| 4,169,554 A | 10/1979 | Camp |
| 4,178,727 A | 12/1979 | Prusinski et al. |
| 4,213,448 A | 7/1980 | Hebert |
| 4,219,072 A | 8/1980 | Barlow, Sr. |
| 4,237,023 A | 12/1980 | Johnson et al. |
| 4,258,696 A | 3/1981 | Gopal |
| 4,259,401 A | 3/1981 | Chahroudi et al. |
| 4,277,357 A | 7/1981 | Boardman |
| 4,290,416 A | 9/1981 | Maloney |
| 4,294,078 A | 10/1981 | MacCracken |
| 4,332,690 A | 6/1982 | Kimura et al. |
| 4,360,442 A | 11/1982 | Reedt et al. |
| 4,403,644 A | 9/1983 | Hebert |
| 4,403,645 A | 9/1983 | MacCracken |
| 4,462,390 A | 7/1984 | Holdridge et al. |
| 4,498,459 A | 2/1985 | Korin et al. |
| 4,504,402 A | 3/1985 | Chen et al. |
| 4,505,953 A | 3/1985 | Chen et al. |
| 4,513,053 A | 4/1985 | Chen et al. |
| 4,532,917 A | 8/1985 | Taff et al. |
| 4,572,864 A | 2/1986 | Benson et al. |
| 4,585,572 A | 4/1986 | Lane et al. |
| 4,587,279 A | 5/1986 | Salyer et al. |
| 4,587,404 A | 5/1986 | Smith |
| 4,615,381 A | 10/1986 | Maloney |
| 4,617,332 A | 10/1986 | Salyer et al. |
| 4,637,888 A | 1/1987 | Lane et al. |
| 4,690,769 A | 9/1987 | Lane et al. |
| 4,702,853 A | 10/1987 | Benson et al. |
| 4,708,812 A | 11/1987 | Hatfield |
| 4,711,813 A | 12/1987 | Salyer |
| 4,727,930 A | 3/1988 | Bruckner et al. |
| 4,746,479 A | 5/1988 | Hanaki et al. |
| 4,747,240 A | 5/1988 | Voisinet et al. |
| 4,756,958 A | 7/1988 | Bryant et al. |
| 4,807,696 A | 2/1989 | Colvin et al. |
| 4,825,939 A | 5/1989 | Salyer et al. |
| 4,828,542 A | 5/1989 | Hermann |
| 4,851,291 A | 7/1989 | Vigo et al. |
| 4,856,294 A | 8/1989 | Scaringe et al. |
| 4,871,615 A | 10/1989 | Vigo et al. |
| 4,897,438 A | 1/1990 | Kikuchi et al. |
| 4,908,166 A | 3/1990 | Salyer |
| 4,908,238 A | 3/1990 | Vigo et al. |
| 4,924,935 A | 5/1990 | Van Winckel |
| 4,964,402 A | 10/1990 | Grim et al. |
| 4,983,798 A | 1/1991 | Eckler et al. |
| 4,988,543 A | 1/1991 | Houle et al. |
| 5,007,478 A | 4/1991 | Sengupta |
| 5,008,133 A | 4/1991 | Herbet et al. |
| 5,053,446 A | 10/1991 | Salyer |
| 5,085,790 A | 2/1992 | Hormansdorfer |
| 5,106,520 A | 4/1992 | Salyer |
| 5,115,859 A | 5/1992 | Roebelen, Jr. et al. |
| 5,202,150 A | 4/1993 | Benson et al. |
| 5,211,949 A | 5/1993 | Salyer |
| 5,220,954 A | 6/1993 | Longardner et al. |
| 5,254,380 A | 10/1993 | Salyer |
| 5,282,994 A | 2/1994 | Salyer |

(List continued on next page.)

FOREIGN PATENT DOCUMENTS

| | | |
|---|---|---|
| DE | 4307065 | 6/1994 |
| EP | 0306202 | 8/1988 |
| JP | 61218683 | 9/1986 |

(List continued on next page.)

OTHER PUBLICATIONS

M. Freund, et al., "Paraffin Products–Properties, Technologies, Applications," edited by GY. Mózes, 1982, pp. 62–68, Elsevier Scientific Publishing Company.

(List continued on next page.)

Primary Examiner—Nathan M. Nutter
(74) Attorney, Agent, or Firm—Cooley Godward LLP

(57) ABSTRACT

A stabilized phase change composition comprises a phase change material and a stabilizing agent selected from the group consisting of antioxidants and thermal stabilizers. The stabilizing agent provides oxidative or thermal stabilization to the phase change material. The stabilized phase change composition may be used or incorporated in a variety of processes (e.g., melt spinning processes, extrusion processes, injection molding processes, and so forth) to form articles having enhanced reversible thermal properties. Exemplary articles that may be formed include, by way of example and not by limitation, synthetic fibers (e.g., nylon fibers, polyester fibers, polyethylene fibers, polypropylene fibers, and multi-component fibers), fabric materials, textiles, films, foams, sheets, pellets, granules, rods, and injection molded articles.

13 Claims, 1 Drawing Sheet

U.S. PATENT DOCUMENTS

| | | | |
|---|---|---|---|
| 5,290,904 A | 3/1994 | Colvin et al. | |
| 5,356,967 A | 10/1994 | Bohshar et al. | |
| 5,366,801 A | * 11/1994 | Bryant et al. | 442/131 |
| 5,370,814 A | 12/1994 | Salyer | |
| 5,381,670 A | 1/1995 | Tippmann et al. | |
| 5,386,701 A | 2/1995 | Cao | |
| RE34,880 E | 3/1995 | Salyer | |
| 5,415,222 A | 5/1995 | Colvin et al. | |
| 5,424,519 A | 6/1995 | Salee | |
| 5,433,953 A | 7/1995 | Tsuei et al. | |
| 5,435,376 A | 7/1995 | Hart et al. | |
| 5,477,917 A | 12/1995 | Salyer | |
| 5,499,460 A | 3/1996 | Bryant et al. | |
| 5,501,268 A | 3/1996 | Stovall et al. | |
| 5,507,337 A | 4/1996 | Rafalovich et al. | |
| 5,532,039 A | 7/1996 | Payne et al. | |
| 5,552,075 A | 9/1996 | Salyer | |
| 5,565,132 A | 10/1996 | Salyer | |
| 5,589,194 A | 12/1996 | Tsuei et al. | |
| 5,626,936 A | 5/1997 | Alderman | |
| 5,637,389 A | 6/1997 | Colvin et al. | |
| 5,647,226 A | 7/1997 | Scaringe et al. | |
| 5,669,584 A | 9/1997 | Hickey | |
| 5,677,048 A | 10/1997 | Pushaw | |
| 5,687,706 A | 11/1997 | Goswami et al. | |
| 5,722,482 A | 3/1998 | Buckley | |
| 5,750,962 A | 5/1998 | Hyatt | |
| 5,755,216 A | 5/1998 | Salyer | |
| 5,755,987 A | 5/1998 | Goldstein et al. | |
| 5,755,988 A | 5/1998 | Lane et al. | |
| 5,763,335 A | 6/1998 | Hermann | |
| 5,765,389 A | 6/1998 | Salyer | |
| 5,770,295 A | 6/1998 | Alderman | |
| 5,785,884 A | 7/1998 | Hammond | |
| 5,788,912 A | 8/1998 | Salyer | |
| 5,804,266 A | 9/1998 | Salyer | |
| 5,804,297 A | 9/1998 | Colvin et al. | |
| 5,851,338 A | 12/1998 | Pushaw | |
| 5,884,006 A | 3/1999 | Frohlich et al. | |
| 5,885,475 A | 3/1999 | Salyer | |
| 5,897,952 A | 4/1999 | Vigo et al. | |
| 5,899,088 A | 5/1999 | Purdum | |
| 5,911,923 A | 6/1999 | Work et al. | |
| 5,932,129 A | 8/1999 | Hyatt | |
| 5,935,157 A | 8/1999 | Harmon | |
| 5,955,188 A | 9/1999 | Pushaw | |
| 5,976,400 A | 11/1999 | Muffett et al. | |
| 5,997,762 A | 12/1999 | Haget et al. | |
| 5,999,699 A | 12/1999 | Hyatt | |
| 6,004,662 A | 12/1999 | Buckley | |
| 6,025,287 A | 2/2000 | Hermann | |
| 6,041,437 A | 3/2000 | Barker et al. | |
| 6,047,106 A | 4/2000 | Salyer | |
| 6,048,810 A | 4/2000 | Baychar | |
| 6,077,597 A | 6/2000 | Pause | |
| 6,079,404 A | * 6/2000 | Salyer | 126/263.03 |
| 6,099,555 A | 8/2000 | Sabin | |
| 6,099,894 A | 8/2000 | Holman | |
| 6,108,489 A | 8/2000 | Frohlich et al. | |
| 6,109,338 A | 8/2000 | Butzer | |
| 6,116,330 A | 9/2000 | Salyer | |
| 6,119,573 A | 9/2000 | Berens et al. | |
| 6,120,530 A | 9/2000 | Nuckols et al. | |
| 6,125,645 A | 10/2000 | Horn | |
| 6,136,217 A | 10/2000 | Haget et al. | |
| 6,170,561 B1 | 1/2001 | O'Grady | |
| 6,171,647 B1 | 1/2001 | Holman | |
| 6,179,879 B1 | 1/2001 | Robinson et al. | |
| 6,183,855 B1 | 2/2001 | Buckley | |
| 6,185,742 B1 | 2/2001 | Doherty | |
| 6,197,415 B1 | * 3/2001 | Holman | |
| 6,207,738 B1 | * 3/2001 | Zuckerman et al. | 524/156 |
| 6,214,303 B1 | 4/2001 | Hoke et al. | |
| 6,214,915 B1 | 4/2001 | Avakian et al. | |
| 6,217,993 B1 | 4/2001 | Pause | |
| 6,230,444 B1 | 5/2001 | Pause | |
| 6,277,439 B1 | 8/2001 | Painter | |
| 6,277,907 B1 | 8/2001 | Gelbin | |

FOREIGN PATENT DOCUMENTS

| | | |
|---|---|---|
| JP | 6017042 | 1/1994 |
| JP | 10102050 | 4/1998 |
| RU | 2126813 | 2/1999 |
| WO | WO 87/07854 | 12/1987 |
| WO | WO 93/15625 | 8/1993 |
| WO | WO 93/24241 | 12/1993 |
| WO | WO 95/29057 | 11/1995 |
| WO | WO 95/34609 | 12/1995 |
| WO | WO 97/31081 | 8/1997 |
| WO | WO 97/43512 | 11/1997 |
| WO | WO 98/42929 | 10/1998 |
| WO | WO 98/45208 | 10/1998 |
| WO | WO 98/46669 | 10/1998 |
| WO | WO 99/25549 | 5/1999 |
| WO | WO 00/61360 | 10/2000 |
| WO | WO 00/65100 | 11/2000 |
| WO | WO 01/35511 | 5/2001 |
| WO | WO 01/38810 | 5/2001 |
| WO | WO 02/12607 | 2/2002 |

OTHER PUBLICATIONS

Seongok Han, et al., "Thermal/Oxidative Degradation and Stabilization of Polyethylene Glycol," *Polymer*, 1997, pp. 317–323, vol. 38, No. 2, Copyright 1996 Elsevier Science Ltd.

Weston® TNPP, 399 Phosphites, Technical Data Sheet CA–209F, Copyright 1998 by General Electric Company or Affilates.

Yvonne G. Bryant, "Melt Spun Fibers Containing Microencapsulated Phase Change Material," HTD–vol. 363/BED–vol. 44, pp. 225–234, *Advances in Heat and Mass Transfer in Biotechnology–1999*, ASME 1999.

"Center for Advanced Engineering Fibers and Films," Fundamentals of Melt Spinning Technology, Clemson University, Clemson, SC, Apr. 4–5, 2000.

Don De Laney, "Introduction to Polymers," Fundamentals of Melt Spinning Technology, Clemson University, Clemson, SC, Apr. 4–5, 2000.

Don De Laney, "Rheological Measurements for Control of Resin and Fiber Production Processes," Fundamentals of Melt Spinning Technology, Clemson University, Clemson, SC, Apr. 4–5, 2000.

Steven T. Correale, "Fiber Structure and Its Characterization," Fundamentals of Melt Spinning Technology, Clemson University, Clemson, SC, Apr. 4–5, 2000.

Hassan M. Behery, "Relationship Between Manufacturing Parameters, Structure and Properties of Polyester," Fundamentals of Melt Spinning Technology, Clemson University, Clemson, SC, Apr. 4–5, 2000.

Huei–Hsiung Wang, "Effects of On–Line Heat Treatment During High Speed Spinning of Polyester Filaments on Dye Uptake," *Textile Research Journal*, Jun. 1997, pp. 428–435, 67(6).

Dale R. Gregory, "Effects of Denier and Orientation Variation on Properties and Processing Performance of MeltSpun Fibers," Fundamentals of Melt Spinning Technology, Clemson University, Clemson, SC, Apr. 4–5, 2000.

Steve Sherriff, "Troubleshooting and Practical Learnings," Fundamentals of Melt Spinning Technology, Clemson University, Clemson, SC, Apr. 4–5, 2000.

Hassan M. Behery, "The Relationship Between Manufacturing Parameters, Structure and Properties of Nylon," Fundamentals of Melt Spinning Technology, Clemson University, Clemson, SC, Apr. 4–5, 2000.

Maurice Blackburn et al., "Fundamentals of Melt Spinning Technology and Engineering Update," Fundamentals of Melt Spinning Technology, Clemson University, Clemson, SC, Apr. 4–5, 2000.

Christine Ronaghan, "Extrusion Process Technology," Fundamentals of Melt Spinning Technology, Clemson University, Clemson, SC, Apr. 4–5, 2000.

Glenn Woodcock, "Gear Pumps in the Synthetic Fiber Production Process," Fundamentals of Melt Spinning Technology, Clemson University, Clemson, SC, Apr. 4–5, 2000.

Glenn Woodcock, "Filtration in the Synthetic Fiber Production Process," Fundamentals of Melt Spinning Technology, Clemson University, Clemson, SC, Apr. 4–5, 2000.

Mark Willingham, "Proper Selection of Pack Filter Media," Fundamentals of Melt Spinning Technology, Clemson University, Clemson, SC, Apr. 4–5, 2000.

John Hagewood et al., "Bicomponent Fibers," Fundamentals of Melt Spinning Technology, Clemson University, Clemson, SC, Apr. 4–5, 2000.

John P. Walters, "Fire Retardant Polypropylene for Textiles," Fundamentals of Melt Spinning Technology, Clemson University, Clemson, SC, Apr. 4–5, 2000.

I. Lewis Langley, "An Overview of Cleaning Spin Packs and Process Equipment," Fundamentals of Melt Spinning Technology, Clemson University, Clemson, SC, Apr. 4–5, 2000.

Richard P. Mason et al., "Metal Powder as a Filtration Media in Melt Spinning," Fundamentals of Melt Spinning Technology, Clemson University, Clemson, SC, Apr. 4–5, 2000.

"Cleaning Spinnerettes and Pack Assemblies –Industrial Cleaning Systems, Inc.," Fundamentals of Melt Spinning Technology, Clemson University, Clemson, SC, Apr. 4–5, 2000.

* cited by examiner

STABLE PHASE CHANGE MATERIALS FOR USE IN TEMPERATURE REGULATING SYNTHETIC FIBERS, FABRICS AND TEXTILES

CROSS-REFERENCE TO RELATED APPLICATIONS

This application claims the benefit of U.S. Provisional Application Ser. No. 60/234,149, filed Sep. 21, 2000.

The present invention is related to the inventions disclosed in the copending, coassigned patent applications of Magill et al., entitled "Multi-Component Fibers Having Enhanced Reversible Thermal Properties", U.S. Ser. No. 09/960,591, filed on like date herewith, and Hartmann, et al., entitled "Melt Spinnable Concentrate Pellets Having Enhanced Reversible Thermal Properties", U.S. Ser. No. 09/777,512, filed Feb. 6, 2001, the disclosures of which are incorporated herein by reference in their entirety.

FIELD OF THE INVENTION

The present invention relates generally to phase change materials. More particularly, the present invention relates to stabilized phase change materials and methods of stabilizing phase change materials that are useful in the manufacture of melt spun synthetic fibers.

BACKGROUND OF THE INVENTION

Many fabric materials are made from synthetic fibers. While the spirit and scope of this invention is not to be limited to the following definition, a fiber is typically considered to have a length several times (e.g., 100 times or more) greater than its diameter. Conventionally, two processes are used to manufacture synthetic fibers: a wet solution process and a melt spinning process. The wet solution process is generally used to form acrylic fibers, while the melt spinning process is generally used to form nylon fibers, polyester fibers, polypropylene fibers, and other similar type fibers. As is well known, a nylon fiber comprises a long-chain synthetic polyamide polymer characterized by the presence of an amide group —CONH—, a polyester fiber comprises a long-chain synthetic polymer having at least 85 percent by weight of an ester of a substituted aromatic carboxylic acid unit, and a polypropylene fiber comprises a long-chain synthetic crystalline polymer having at least 85 percent by weight of an olefin unit and typically having a molecular weight of about 40,000 or more.

The melt spinning process is of particular interest since a large portion of the synthetic fibers that are used in the textile industry are manufactured by this technique. The melt spinning process generally involves passing a melted polymeric material through a device that is known as a spinneret to thereby form a plurality of individual synthetic fibers. Once formed, the synthetic fibers may be collected into a strand or made into a cut staple. The synthetic fibers can be used to make woven or non-woven fabric materials, or alternatively, the synthetic fibers can be wound into a yarn to be used thereafter in a weaving or a knitting process to form a synthetic fabric material.

Phase change materials have been incorporated into acrylic fibers to provide enhanced reversible thermal properties to the fibers themselves as well as to fabric materials made therefrom. This is readily accomplished, in part due to the high levels of volatile materials (e.g., solvents) typically associated with the wet solution process of forming acrylic fibers. However, it is more problematic to incorporate phase change materials into melt spun synthetic fibers. During a melt spinning process, temperatures involved are typically in the range of from about 200° C. to about 380° C., and pressures encountered may be as high as 3000 pounds per square inch. Such processing conditions may induce degradation of the phase change materials and thus may lead to inadequate levels of thermal regulating properties normally associated with use of the phase change materials.

At elevated temperatures or pressures, certain phase change materials such as, for example, paraffinic hydrocarbons and waxes may undergo thermally induced decomposition or isomerization. Factors affecting the extent and nature of thermally induced decomposition and isomerization include magnitude of temperature, pressure, and duration of time during which a phase change material is subjected to elevated temperatures or pressures. For paraffinic hydrocarbons at a temperature of about 350° C., thermally induced decomposition may lead to formation of lower molecular weight products (e.g., gaseous products), and thermally induced isomerization may lead to formation of branched-chain alkanes. Accordingly, a lesser amount of an unreacted paraffinic hydrocarbon may remain to effectively provide a thermal regulating property. Moreover, products resulting from thermally induced decomposition or isomerization may act as impurities. For example, a magnitude of a paraffinic hydrocarbon's latent heat of fusion may depend on the purity of the paraffinic hydrocarbon and on the ability of the paraffinic hydrocarbon to crystallize fully. Impurities resulting from thermally induced decomposition or isomerization may hinder crystallization of a remaining unreacted paraffinic hydrocarbon to further reduce its effectiveness.

Alternatively or in conjunction with thermally induced decomposition or isomerization, certain phase change materials may undergo oxidation at elevated temperatures or pressures. For example, paraffinic hydrocarbons may undergo significant oxidation in the presence of atmospheric oxygen at temperatures as low as about 80° C. to about 120° C. Oxidation may lead to a lesser amount of an unreacted phase change material remaining to effectively provide a thermal regulating property. Moreover, products resulting from oxidation of the phase change material may act as impurities to further reduce effectiveness of the phase change material. For example, oxidation of paraffinic hydrocarbons may lead to formation of organic products such as, for example, esters, alcohols, aldehydes, acids, peroxides, or water. The presence of impurities can lower the latent heat and adversely affect a thermal regulating property provided by a phase change material and by a synthetic fiber or fabric material in which the phase change material is incorporated.

When a phase change material is degraded as a result of elevated temperatures or pressures, the melt spinning process itself can be adversely affected. In particular, products resulting from thermally induced decomposition, thermally induced isomerization, or oxidation of the phase change material may react with a fiber-grade thermoplastic polymer and lead to degradation (e.g., weakening or discoloration) of the polymer itself and of a resulting synthetic fiber.

It is against this background that a need arose to develop stabilized phase change materials that would be useful in the manufacture of melt spun synthetic fibers.

SUMMARY OF THE INVENTION

In one innovative aspect, the present invention relates to a stabilized phase change composition. In one exemplary embodiment, the stabilized phase change composition may comprise a phase change material and a stabilizing agent selected from the group consisting of antioxidants and thermal stabilizers.

In another innovative aspect, the present invention relates to an encapsulated phase change material. In one exemplary embodiment, the encapsulated phase change material may comprise a hollow shell defining an internal cavity and a phase change composition positioned in the internal cavity, wherein the phase change composition comprises a phase change material and a stabilizing agent selected from the group consisting of antioxidants and thermal stabilizers.

In another exemplary embodiment, the encapsulated phase change material may comprise a hollow shell defining an internal cavity, wherein the hollow shell comprises a base material and a stabilizing agent dispersed within the base material, and the stabilizing agent is selected from the group consisting of antioxidants and thermal stabilizers. The encapsulated phase change material may further comprise a phase change material positioned in the internal cavity.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION

Figure 1:
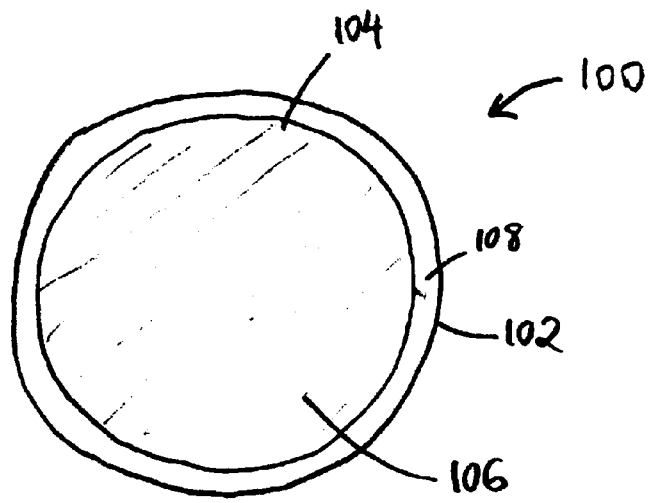
FIG. 1 illustrates an enlarged cross sectional view of an exemplary embodiment of an encapsulated phase change material.

The present invention relates to stabilized phase change materials and methods of stabilizing phase change materials. More particularly, embodiments of the invention provide for the oxidative stabilization and thermal stabilization of phase change materials. Oxidative stabilization may be provided through use of one or more antioxidants, while thermal stabilization may be provided through use of one or more thermal stabilizers. The stabilized phase change materials and stabilization methods in accordance with various embodiments of the invention may be used or incorporated in a variety of processes (e.g., melt spinning processes, extrusion processes, injection molding processes, and so forth) to form articles having enhanced reversible thermal properties. Embodiments of the invention offer a degree of protection to the phase change materials from elevated temperatures or pressures to form a variety of articles, such as, by way of example and not by limitation, synthetic fibers (e.g., nylon fibers, polyester fibers, polyethylene fibers, polypropylene fibers, and multi-component fibers), fabric materials, textiles, films, foams, sheets, pellets, granules, rods, and injection molded articles.

In general, a phase change material may comprise any substance (or mixture of substances) that has the capability of absorbing or releasing thermal energy to reduce or eliminate heat flow at or within a temperature stabilizing range. The temperature stabilizing range may comprise a particular transition temperature or range of transition temperatures. A phase change material used in conjunction with various embodiments of the invention preferably will be capable of inhibiting a flow of thermal energy during a time when the phase change material is absorbing or releasing heat, typically as the phase change material undergoes a transition between two states (e.g., liquid and solid states, liquid and gaseous states, solid and gaseous states, or two solid states). This action is typically transient, e.g., will occur until a latent heat of the phase change material is absorbed or released during a heating or cooling process. Thermal energy may be stored or removed from the phase change material, and the phase change material typically can be effectively recharged by a source of heat or cold.

According to some embodiments of the invention, a phase change material may be a solid/solid phase change material. A solid/solid phase change material is a type of phase change material that typically undergoes a transition between two solid states (e.g., a crystalline or mesocrystalline phase transformation) and hence typically does not become a liquid during use.

Phase change materials that can benefit from stabilization in accordance with various embodiments of the invention include a variety of organic substances. Exemplary phase change materials include, by way of example and not by limitation, hydrocarbons (e.g., straight chain alkanes or paraffinic hydrocarbons, branched-chain alkanes, unsaturated hydrocarbons, halogenated hydrocarbons, and alicyclic hydrocarbons), waxes, oils, fatty acids, fatty acid esters, dibasic acids, dibasic esters, 1-halides, primary alcohols, aromatic compounds, anhydrides (e.g., stearic anhydride), ethylene carbonate, polyhydric alcohols (e.g., 2,2-dimethyl-1,3-propanediol, 2-hydroxymethyl-2-methyl-1,3-propanediol, ethylene glycol, polyethylene gylcol, pentaerythritol, dipentaerythrital, pentaglycerine, tetramethylol ethane, neopentyl glycol, tetramethylol propane, monoaminopentaerythritol, diaminopentaerythritol, and tris (hydroxvmethyl)acetic acid), polymers (e.g., polyethylene, polyethylene glycol, polypropylene, polypropylene glycol, polytetramethylene glycol, and copolymers, such as polyacrylate or poly(meth)acrylate with alkyl hydrocarbon side chain or with polyethylene glycol side chain and copolymers comprising polyethylene, polyethylene glycol, polypropylene, polypropylene glycol, or polytetramethylene glycol), and mixtures thereof.

Table 1 provides a list of exemplary paraffinic hydrocarbons that may be used as the phase change material stabilized in the accordance with various embodiments of the invention.

TABLE 1

| Paraffinic Hydrocarbon | No. of Carbon Atoms | Melting Point ° C. |
|---|---|---|
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

A phase change material can be a mixture of two or more substances (e.g., two or more of the exemplary phase change materials discussed above). By selecting two or more different substances (e.g., two different paraffinic hydrocarbons) and forming a mixture thereof, a temperature stabilizing range can be adjusted over a wide range for any desired application. According to some embodiments of the invention, a phase change material may comprise a copolymer of two or more substances (e.g., two or more of the exemplary phase change materials discussed above).

Phase change materials that can benefit from stabilization in accordance with the invention may include phase change materials in a non-encapsulated form and phase change materials in an encapsulated form. A phase change material in a non-encapsulated form may be provided as a solid in a variety of forms (e.g., bulk form, powders, pellets, granules, flakes, and so forth) or as a liquid in a variety of forms (e.g., molten form, dissolved in a solvent, and so forth).

In general, an antioxidant used in conjunction with various embodiments of the invention may comprise any substance (or mixture of substances) that has the capability of preventing or retarding oxidation of a substance (or mixture of substances) to be stabilized (e.g., a phase change material). According to some embodiments of the invention, an antioxidant has the capability of preventing or retarding oxidation of a phase change material in the presence of oxygen (e.g., atmospheric oxygen) or in the presence of oxygen free radicals at temperatures and pressures encountered in processes such as, for example, melt spinning processes, extrusion processes, or injection molding processes. In particular, an antioxidant in accordance with an embodiment of the invention may prevent or retard formation of products resulting from reaction of the phase change material with oxygen or with oxygen free radicals, which products may include, for example, esters, alcohols, aldehydes, acids, peroxides, or water. Typically, an antioxidant may be selected to be compatible with (e.g., low chemical reactivity with respect to) a phase change material to be stabilized.

Exemplary antioxidants that may be used in accordance with various embodiments of the invention include phenolic antioxidants (i.e., antioxidants comprising a benzene ring attached to one or more hydroxy groups -OH) such as, by way of example and not by limitation, octadecyl-3-(3,5-di-tert butyl-4-hydroxyphenyl) propionate; 2,6-di-tert-butyl-p-cresol; 2,6-diphenyl-4-octadecyloxyphenol; stearyl-(3,5-dimethyl-4-hydroxybenzyl) thioglycolate; stearyl-beta-(4-hydroxy-3,5-di-tert-butylphenyl) propionate; distearyl-3,5-di-tert-butyl-4-hydroxybenzyl phosphate; 2,4,6-tris(3',5'-di-tert-butyl-4'-hydroxybenzylthio)-1,3,5-triazine; distearyl(4-hydroxy-3-methyl-5-tert-butyl) benzylmalonate; 2,2'-methylenebis(4-methyl-6-tert-butylphenol); 4,4'-methylenebismethylenebis(2,6-di-tert-butylphenol); 2,2'-metbylenebis[6-(1-methylcyclohexyl)p-cresol]; bis[3,5-bis(4-hydroxy-3-tert-butylphenyl)butyric acid] glycol ester; 4,4'-butylidenebis(6-tert-butyl-m-cresol); 2,2'-ethylidenebis(4,6-di-tert-butylphenol); 2,2'-ethylidenebis(4-sec-butyl-6-sec-butylphenol); 1,1,3-tris(2-methyl-4-hydroxy-5-tert-butylphenyl)butane; bis[2-tert-butyl-4-methyl-6-(2-hydroxy-3-tert-butyl-5-methylbenzyl-phenyl] terephthalate; 1,3,5-tris(2,6-dimethyl-3-hydroxy-4-tert-butylbenzyl) isocyanurate; 1,3,5-tris(3,5-di-tert-butyl-4-hydroxybenzyl)-2,4,6-trimethylbenzene; tetrakis[methylene-3-(3,5-di-tert-butyl-4-hydroxyphenyl)propionate]methane; 1,3,5-tris(3,5-di-tert-butyl-4-hydroxybenzyl) isocyanurate; 1,3,5-tris[(3,5-di-tert-butyl-4-hydroxyphenyl)propionyloxyethyl] isocyanurate; 2-octylthio-4,6-di(4-hydroxy-3,5-di-tert-butyl)phenoxy-1,3,5-triazine; 4,4'-thiobis(6-tert-butyl-m-cresol); 2,2'-thiobis(6-t-butyl-4-methylphenol); 2,2'-thiobis (4-octylphenol); 4,4'-thiobis(6-t-butyl-3-methylphenol); 4,4'-thiobis(6-t-butyl-2-methylphenol); phenolic polymers; and mixtures thereof.

It should be recognized that phenolic antioxidants may include sterically hindered phenolic antioxidants, according to some embodiments of the invention. As one of ordinary skill in the art will understand, the term "sterically hindered" is typically understood to refer to an arrangement of atoms of a molecule such that its reactivity with respect to another molecule may be prevented or retarded. A desirable sterically hindered phenolic antioxidant according to an embodiment of the invention is octadecyl-3-(3,5-di-tert butyl-4-hydroxyphenyl) propionate, which is available under the trade name IRGANOX 1076 from Ciba Specialty Chemicals, Inc.

Other exemplary antioxidants include thioether antioxidants (i.e., antioxidants comprising a sulfide group —S—) such as, by way of example and not by limitation, thioether antioxidants comprising polyhydric alcohol esters of dialkyl thiodipropionate (e.g., dilauryl thiodipropionate, dimyristyl thiodipropionate, distearyl thiodipropionate, and so forth) and alkyl thiopropionate (e.g., butyl thiopropionate, octyl thiopropionate, lauryl thiopropionate, stearyl thiopropionate, and so forth). Exemplary polyhydric alcohols include, by way of example and not by limitation, ethylene glycol, polyethylene gylcol, pentaerythritol, dipentaerythrital, pentaglycerine, tetramethylol ethane, neopentyl glycol, tetramethylol propane, monoaminopentaerythritol, diaminopentaerythritol, and tris (hydroxymethyl)acetic acid.

In general, a thermal stabilizer used in accordance with various embodiments of the invention may comprise any substance (or mixture of substances) that has the capability of preventing or retarding thermally induced decomposition or isomerization of a substance (or mixture of substances) to be stabilized (e.g., a phase change material). According to some embodiments of the invention, a thermal stabilizer has the capability of preventing or retarding thermally induced decomposition or isomerization of a phase change material at temperatures and pressures encountered in processes such as, for example, melt spinning processes, extrusion processes, or injection molding processes. In particular, a thermal stabilizer in accordance with an embodiment of the invention may prevent or retard formation of lower molecular weight products or isomers resulting from thermally induced decomposition or isomerization of the phase change material. Typically, a thermal stabilizer may be selected to be compatible with (e.g., low chemical reactivity with respect to) a phase change material to be stabilized.

Exemplary thermal stabilizers that may be used in accordance with various embodiments of the invention include organic substances comprising phosphorus (e.g., phosphites (i.e., organic substances comprising a phosphorus atom attached to three oxygen atoms by single bonds, respectively), phosphonites (i.e., organic substances comprising a phosphorus atom attached to two oxygen atoms and one carbon atom by single bonds, respectively), and so forth) such as, by way of example and not by limitation, trisnonylphenyl phosphite; tridecyl phosphite; octyl diphenyl phosphite; tris(2,4-di-tert-butylphenyl) phosphite; triphenyl phosphite; tris(mono, di-mixed nonylphenyl) phosphite; distearyl pentaerythritol diphosphite; hexa(tridecyl)-1,1,3-tris(2-methyl-5-tert-butyl-4-hydroxyphenyl)butane triphosphite; tetra(C.sub.12–15 mixed alkyl)-4,4'-isopropylidene diphenyl diphosphite; tetra(tridecyl)-4,4'-butylidenebis(3-methyl-6-tert-butylphenol) diphosphite; bis (octylphenyl).bis [4,4'-butylidenebis(3-methyl-6-tertbutylphenol)].1,6-hexanediol diphosphite; phenyl.4,4'-isopropylidenediphenol.pentaerythritol diphosphite; bis(2,4-di-tert-butylphenyl)pentaerythritol diphosphite; di(nonylphenyl)pentaerythritol diphosphite; 9,10-dihydro-9-oxa-10-phosphaphenanthrene-10-oxide; tetrakis-(2,4-di-tert-butylphenyl)-4,4'-biphenylene diphosphite, 3,9-di(2,4-di-tert-butylphenoxy)-2,4,8,10-tetraoxa-3,9-diphosphaspiro[5.5]undecane; tetrakis(2,4-di-tert-butylphenyl)-4,4'-bis(diphenylene) phosphonite; tetrakis(2,4-di-tert-butylphenyl) 4,4'-biphenylene diphosphonite; and mixtures thereof.

According to an embodiment of the invention, a thermal stabilizer used is desirably trisnonylphenyl phosphite (molecular formula: $C_{45}H_{69}O_3P$), which is available under the trade name Weston TNPP Phosphite from GE Specialty Chemicals, Inc.

Certain embodiments of the invention relate to a stabilized phase change composition. According to some embodiments of the invention, the phase change composition may comprise a phase change material and one or more stabilizing agents. A stabilizing agent may be an antioxidant or a thermal stabilizer, according to some embodiments of the invention.

The phase change composition may comprise from about 0.01 percent to about 10 percent by weight of a stabilizing agent and from about 90 percent to about 99.99 percent by weight of the phase change material, according to some embodiments of the invention. According to an embodiment of the invention, the phase change composition typically comprises from about 0.02 percent to about 1 percent by weight of a stabilizing agent.

It should be recognized that two or more stabilizing agents may be included in the phase composition according to some embodiments of the invention, and the stabilizing agents may differ from each other in some fashion. For instance, the phase change composition may comprise an antioxidant and a thermal stabilizer, two different antioxidants, or two different thermal stabilizers. According to some embodiments of the invention, the phase change composition may comprise from about 0.01 percent to about 10 percent by weight and typically from about 0.02 percent to about 1 percent by weight of the two or more stabilizing agents taken collectively. According to other embodiments of the invention, the phase change composition may comprise from about 0.01 percent to about 10 percent by weight and typically from about 0.02 percent to about 1 percent by weight of each of the two or more stabilizing agents.

In forming the phase change composition, one or more stabilizing agents may be incorporated during a wet flushing step of forming the phase change material. Alternatively or in conjunction, one or more stabilizing agents may be added to, mixed with, or dispersed in the phase change material in a non-encapsulated form to form the phase change composition. For instance, one or more stabilizing agents may be dry blended with the phase change material in a solid form or dispersed in the phase change material in a liquid form. Depending on the method used to form the phase change composition and other factors (e.g., miscibility or solubility of the one or more stabilizing agents in the phase change material), the phase change composition may be provided as, by way of example and not by limitation, a solid mixture, a liquid mixture, a suspension, a solution, or other forms.

Once formed, the stabilized phase change composition may be used in melt spinning processes, extrusion processes, or injection molding processes to form a variety of articles having enhanced reversible thermal properties. According to some embodiments of the invention, the phase change composition may be mixed with one or more polymeric materials to form a blend, such as by dispersing the phase change composition in a melt of the one or more polymeric materials. In general, a polymeric material used to form the blend may comprise any polymer (or mixture of polymers). Typically, a polymeric material comprises a thermoplastic polymer (or mixture of thermoplastic polymers) (i.e., one that can be heated to form a melt and subsequently shaped or molded to form an article). According to some embodiments of the invention, a polymeric material may be selected to be compatible with or to have an affinity for the phase change composition. Alternatively or in conjunction, the polymeric material may be selected to provide one or more desired physical properties for an article to be formed (e.g., a synthetic fiber).

Exemplary polymeric materials include, by way of example and not by limitation, polyamides (e.g., Nylon 6, Nylon 6/6, Nylon 12, polyaspartic acid, polyglutamic acid, and so forth), polyamines, polyimides, polyacrylics (e.g., polyacrylamide, polyacrylonitrile, esters of methacrylic acid and acrylic acid, and so forth), polycarbonates (e.g., polybisphenol A carbonate, polypropylene carbonate, and so forth), polydienes (e.g., polybutadiene, polyisoprene, polynorbornene, and so forth), polyepoxides, polyesters (e.g., polyethylene terephthalate, polybutylene terephthalate, polytrimethylene terephthalate, polycaprolactone, polyglycolide, polylactide, polyhydroxybutyrate, polyhydroxyvalerate, polyethylene adipate, polybutylene adipate, polypropylene succinate, and so forth), polyethers (e.g., polyethylene glycol (polyethylene oxide), polybutylene glycol, polypropylene oxide, polyoxymethylene (paraformaldehyde), polytetramethylene ether (polytetrahydrofuran), polyepichlorohydrin, and so forth), polyflourocarbons, formaldehyde polymers (e.g., urea-formaldehyde, melamine-formaldehyde, phenol formaldehyde, and so forth), natural polymers (e.g., cellulosics, chitosans, lignins, waxes, and so forth), polyolefins (e.g., polyethylene, polypropylene, polybutylene, polybutene, polyoctene, and so forth), polyphenylenes (e.g., polyphenylene oxide, polyphenylene sulfide, polyphenylene ether sulfone, and so forth), silicon containing polymers (e.g., polydimethyl siloxane, polycarbomethyl silane, and so forth), polyurethanes, polyvinyls (e.g., polyvinyl butryal, polyvinyl alcohol, polyvinyl acetate, polystyrene, polymethylstyrene, polyvinyl chloride, polyvinyl pyrrolidone, polymethyl vinyl ether, polyethyl vinyl ether, polyvinyl methyl ketone, and so forth), polyacetals, polyarylates, copolymers (e.g., polyethylene-co-vinyl acetate, polyethylene-co-acrylic acid, polybutylene terphthalate-co-polytetramethylene terephthalate, polylauryllactam-block-polytetrahydrofuran, and so forth), and mixtures thereof.

It should be recognized that a stabilizing agent comprising the phase change composition may provide oxidative or thermal stabilization not just to the phase change material but also to the one or more polymeric materials comprising the blend, according to some embodiments of the invention. Also, one or more additional stabilizing agents may be added when forming the blend to provide additional oxidative or thermal stabilization to either or both the phase change material and the one or more polymeric materials. The one or more additional stabilizing agents may be the same as or different from the one or more stabilizing agents comprising the phase change composition. The resulting blend may then be processed to form, by way of example and not by limitation, synthetic fibers (e.g., nylon fibers, polyester fibers, polyethylene fibers, polypropylene fibers, and multi-component fibers), films, foams, sheets, pellets, granules, rods, and injection molded articles.

It should be further recognized that the phase change composition may be encapsulated, according to some embodiments of the invention. In particular, additional embodiments of the invention relate to a stabilized encapsulated phase change material. With reference to FIG. 1, an enlarged cross sectional view of an exemplary embodiment of an encapsulated phase change material 100 is illustrated. The encapsulated phase change material 100 comprises a hollow shell 102 defining an internal cavity 104, and a phase change material is enclosed and positioned in the internal cavity 104. In the present embodiment, one or more stabilizing agents are also enclosed and positioned in the internal cavity 104 along with the phase change material to form a stabilized phase change composition 106. The hollow shell 102 may offer an additional degree of protection to the enclosed phase change material from oxidative or thermal degradation. For instance, the hollow shell 102 may reduce exposure of the enclosed phase change material to oxygen or oxygen free radicals. At the same time, a stabilizing agent that is positioned in the internal cavity 104 may provide oxidative or thermal stabilization not just to the enclosed phase change material but also to the hollow shell 102.

In general, the hollow shell 102 may be formed in a variety of regular or irregular shapes (e.g., spherical, ellipsoidal, and so forth) and sizes. According to some embodiments of the invention, the hollow shell 102 may have a maximum linear dimension (e.g., diameter) ranging from about 0.01 to about 2000 microns or from about 0.01 to about 500 microns. According to an embodiment of the invention, the hollow shell 102 is generally spherical and has a diameter that is less than about 100 microns (e.g., from about 0.5 to about 3 microns).

In the presently discussed embodiment, the hollow shell 102 comprises a base material 108. In general, the base material 108 may comprise any substance (or mixture of substances) that can be formed into the hollow shell 102. According to some embodiments of the invention, the base material 108 may be selected in accordance with one or more desired physical properties for the hollow shell 102. Exemplary desired physical properties include, by way of example and not by limitation, mechanical properties (e.g., high strength, high hardness, high flexibility, or low porosity), thermal properties (e.g., high thermal stability), and chemical properties (e.g., low chemical reactivity with respect to the enclosed phase change material or enclosed stabilizing agent).

Exemplary base materials include, by way of example and not by limitation, fatty alcohols (e.g., natural and synthetic fatty alcohols), fatty acids, fatty esters, waxes (e.g., natural waxes, synthetic waxes, and modified waxes), polymeric materials (e.g., polyamides, polyamines, polyimides, polyacrylics, polycarbonates, polydienes, polyepoxides, polyesters, polyethers, polyflourocarbons, formaldehyde polymers, natural polymers, polyolefins, polyphenylenes, silicon containing polymers, polyurethanes, polyvinyls, polyacetals, polyarylates, copolymers, and mixtures thereof), and mixtures thereof.

The phase change composition 106 may be encapsulated using a variety of methods to form the encapsulated phase change material 100. For instance, the phase change composition 106 may be provided as a particle (or particles) or droplet (or droplets), and the particle or droplet may be encapsulated via interfacial polymerization at an outer surface of the particle or droplet to form the hollow shell 102 enclosing the particle or droplet. As another example, the particle or droplet may be coated with a polymeric material in a liquid form (e.g., a molten form), and the polymeric material coating the particle or droplet may then be cured to form the hollow shell 102 enclosing the particle or droplet. Further details regarding exemplary encapsulation methods are described in Tsuei et al., U.S. Pat. No. 5,589,194, entitled "Method of Encapsulation and Microcapsules Produced Thereby"; Tsuei, et al., U.S. Pat. No. 5,433,953, entitled "Microcapsules and Methods for Making Same"; Hatfield, U.S. Pat. No. 4,708,812, entitled "Encapsulation of Phase Change Materials"; and Chen et al., U.S. Pat. No. 4,505,953, entitled "Method for Preparing Encapsulated Phase Change Materials", the disclosures of which are herein incorporated by reference in their entirety.

Once formed, stabilized encapsulated phase change materials (e.g., the encapsulated phase change material 100) may be used in melt spinning processes, extrusion processes, or injection molding processes to form a variety of articles having enhanced reversible thermal properties. According to some embodiments of the invention, the encapsulated phase change materials may be mixed with one or more polymeric materials to form a blend, and the resulting blend may then be processed to form, by way of example and not by limitation, synthetic fibers (e.g., nylon fibers, polyester fibers, polyethylene fibers, polypropylene fibers, and multi-component fibers), films, foams, sheets, pellets, granules, rods, and injection molded articles. As discussed previously, one or more additional stabilizing agents may be added when forming the blend to provide additional oxidative or thermal stabilization to either or both the encapsulated phase change materials and the one or more polymeric materials. The one or more additional stabilizing agents may, for example, be dispersed in a melt of the one or more polymeric materials or may be added in a wet flushing step (e.g., to remove water, if present, coating or absorbed by the encapsulated phase change materials).

Figure 2:
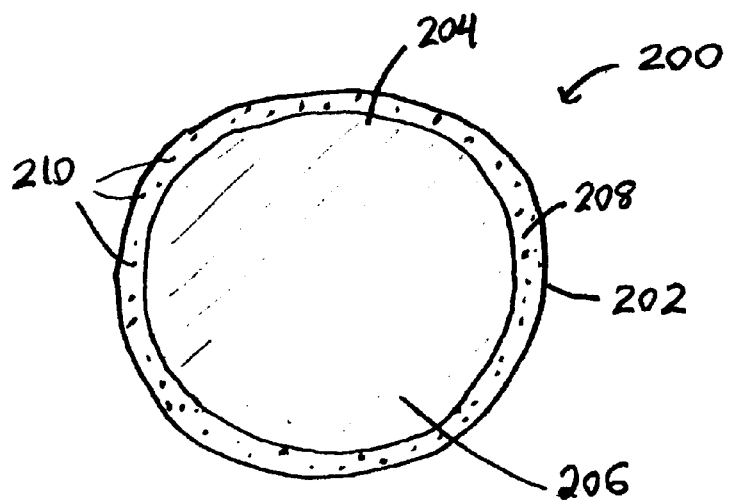
FIG. 2 illustrates an enlarged cross sectional view of another exemplary embodiment of an encapsulated phase change material.

Turning next to FIG. 2, an enlarged cross sectional view of another exemplary embodiment of an encapsulated phase change material 200 is illustrated. As with the previously discussed embodiment, the encapsulated phase change material 200 comprises a hollow shell 202 defining an internal cavity 204, and a phase change material 206 is enclosed and positioned in the internal cavity 204.

In the present embodiment, the hollow shell 202 comprises a base material 208 that has one or more stabilizing agents 210 dispersed therein, and a stabilizing agent may be an antioxidant or a thermal stabilizer. Here, the base material 208 provides a matrix within which the one or more stabilizing agents 210 may be dispersed, and the base material 208 may be selected to be compatible with or to have an affinity for the one or more stabilizing agents 210. Exemplary base materials have been discussed previously. By dispersing a stabilizing agent within the base material 208, oxidative or thermal stabilization may be provided to either or both the hollow shell 202 and the enclosed phase change material 206.

The one or more stabilizing agents 210 may be homogeneously or uniformly dispersed within the base material 208. Alternatively, the one or more stabilizing agents 210 may be non-uniformly dispersed within the base material 208, such as, for example, to concentrate a stabilizing agent in one or more regions or layers of the base material 208 or to distribute the stabilizing agent in accordance with a concentration profile along one or more directions (e.g., a radial direction) along the base material 208. For instance, a stabilizing agent may be dispersed within the base material 208 such as to concentrate the stabilizing agent near an inner surface of the hollow shell 202. Such a configuration may provide greater contact between the stabilizing agent and the enclosed phase change material 206 to facilitate oxidative or thermal stabilization functions provided by the stabilizing agent. It should be recognized that, alternatively or in conjunction, one or more stabilizing agents may be coated on an outer surface or an inner surface of the hollow shell 202.

The hollow shell 202 may comprise from about 0.01 percent to about 10 percent by weight of a stabilizing agent and from about 90 percent to about 99.99 percent by weight of the base material 208, according to some embodiments of the invention. According to an embodiment of the invention, the hollow shell 202 typically comprises from about 0.02 percent to about 1 percent by weight of a stabilizing agent.

It should be recognized that two or more stabilizing agents may be dispersed within the hollow shell 202, and the stabilizing agents may differ from each other in some fashion. For instance, the hollow shell 202 may have an antioxidant and a thermal stabilizer, two different antioxidants, or two different thermal stabilizers dispersed therein. According to some embodiments of the invention, the hollow shell 202 may comprise from about 0.01 percent to about 10 percent by weight and typically from about 0.02 percent to about 1 percent by weight of the two or more stabilizing agents taken collectively. According to other embodiments of the invention, the hollow shell 202 may comprise from about 0.01 percent to about 10 percent by weight and typically from about 0.02 percent to about 1 percent by weight of each of the two or more stabilizing agents.

It should be further recognized that one or more stabilizing agents may be enclosed and positioned in the internal cavity 204 along with the enclosed phase change material 206 to form a stabilized phase change composition. The one or more stabilizing agents comprising the enclosed phase change composition may be the same as or different from the one or more stabilizing agents 210 dispersed within the hollow shell 202. For instance, the hollow shell 202 may have an antioxidant dispersed therein, while a thermal stabilizer may be positioned in the internal cavity 204 along with the enclosed phase change material 206.

The encapsulated phase change material 200 may be formed using a variety of methods. For instance, a particle or droplet of the phase change material 206 may be encapsulated via interfacial polymerization in the presence of the one or more stabilizing agents 210 to form the hollow shell 202 having the one or more stabilizing agents 210 dispersed therein. As another example, the one or more stabilizing agents 210 may be dispersed in a polymeric material in a liquid form (e.g., a molten form) to form a blend, and the particle or droplet of the phase change material 206 may be coated with the blend, which may be subsequently cured to form the hollow shell 202. Once formed, encapsulated phase change materials (e.g., the encapsulated phase change material 200) may be used in melt spinning processes, extrusion processes, or injection molding processes to form a variety of articles having enhanced reversible thermal properties. As discussed previously, one or more additional stabilizing agents may be used to provide additional oxidative or thermal stabilization.

Various other embodiments are within the spirit and scope of the invention. For instance, an embodiment of the invention relates to stabilizing a phase change material in a non-encapsulated form for melt spinning processes, extrusion processes, or injection molding processes. In the present embodiment, one or more stabilizing agents independently selected from the group consisting of antioxidants and thermal stabilizers may be separately provided and need not be mixed (e.g., pre-mixed) with the phase change material. The phase change material and the one or more stabilizing agents may be mixed with one or more polymeric materials to form a blend. It should be recognized that a variety of methods may be used to mix the phase change material, the one or more stabilizing agents, and the one or more polymeric materials. For instance, the one or more polymeric materials may be heated to form a melt, and the phase change material and the one or more stabilizing agents may be added to and dispersed in the melt to form the blend. The phase change material and the one or more stabilizing agents may be added at the same time or at different times. As another example, the phase change material, the one or more stabilizing agents, and the one or more polymeric materials may be provided together, heated, and mixed to form the blend (e.g., by feeding into an extruder). Once formed, the blend may be processed to form a variety of articles having enhanced reversible thermal properties. For instance, the blend may be melt spun to form synthetic fibers or may be extruded or injection molded to form sheets, films, foams, pellets, granules, rods, and so forth.

As another example, an embodiment of the invention relates to stabilizing a phase change material in an encapsulated form for melt spinning processes, extrusion processes, or injection molding processes. In the present embodiment, encapsulated phase change materials may be provided, wherein an encapsulated phase change material may comprise a hollow shell defining an internal cavity and a phase change material enclosed and positioned in the internal cavity. One or more stabilizing agents independently selected from the group consisting of antioxidants and thermal stabilizers may be separately provided, and the encapsulated phase change materials and the one or more stabilizing agents may be mixed with one or more polymeric materials to form a blend. A variety of methods may be used to mix the encapsulated phase change materials, the one or more stabilizing agents, and the one or more polymeric materials. For instance, the one or more polymeric materials may be heated to form a melt, and the encapsulated phase change materials and the one or more stabilizing agents may be added to and dispersed in the melt to form the blend. The encapsulated phase change materials and the one or more stabilizing agents may be added at the same time or at different times. In particular, the one or more stabilizing agents may be added in a wet flushing step (e.g., to remove water, if present, coating or absorbed by the encapsulated phase change materials). As another example, the encapsulated phase change materials, the one or more stabilizing agents, and the one or more polymeric materials may be provided together, heated, and mixed to form the blend (e.g., by feeding into an extruder). Once formed, the blend may be processed to form a variety of articles having enhanced reversible thermal properties.

Each of the patent applications, patents, publications, and other published documents mentioned or referred to in this specification is herein incorporated by reference in its entirety, to the same extent as if each individual patent application, patent, publication, and other published document was specifically and individually indicated to be incorporated by reference.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

What is claimed is:

1. An encapsulated phase change material comprising:

a hollow shell defining an internal cavity; and a phase change composition positioned in the internal cavity, wherein the phase change composition comprises a phase change material and a thermal stabilizer.

2. The encapsulated phase change material of claim 1, wherein the hollow shell has a maximum linear dimension less than 100 microns.

3. The encapsulated phase change material of claim 1, wherein the phase change material is a hydrocarbon or a mixture of hydrocarbons.

4. The encapsulated phase change material of claim 1, wherein the phase change composition further comprises a sterically hindered phenolic antioxidant.

5. The encapsulated phase change material of claim 1 wherein the thermal stabilizer is a phosphite.

6. The encapsulated phase change material of claim 1, wherein the thermal stabilizer is a phosphonite.

7. The encapsulated phase change material of claim 1, wherein the phase change composition comprises from about 0.01 percent to about 10 percent by weight of the thermal stabilizer.

8. The encapsulated phase change material of claim 1, wherein the phase change composition comprises from about 0.02 percent to about 1 percent by weight of the thermal stabilizer.

9. The encapsulated phase change material of claim 1, wherein the phase change composition further comprises an antioxidant.

10. The encapsulated phase change material of claim 9, wherein the antioxidant is a phenolic antioxidant.

11. The encapsulated phase change material of claim 1, wherein the antioxidant is a thioether antioxidant.

12. The encapsulated phase change material of claim 9, wherein the phase change composition comprises from about 0.01 percent to about 10 percent by weight of the antioxidant.

13. The encapsulated phase change material of claim 9, wherein the phase change composition comprises from about 0.02 percent to about 1 percent by weight of the antioxidant.

* * * * *